(12) United States Patent
Ogawa et al.

(10) Patent No.: US 11,521,647 B2
(45) Date of Patent: Dec. 6, 2022

(54) MAGNETIC DISK DEVICE AND MANUFACTURING METHOD THEREOF

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Takuya Ogawa, Machida Tokyo (JP); Shinichirou Kouhara, Hino Tokyo (JP); Wataru Tsukahara, Yokohama Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/461,859

(22) Filed: Aug. 30, 2021

(65) Prior Publication Data

US 2022/0301587 A1    Sep. 22, 2022

(30) Foreign Application Priority Data

Mar. 19, 2021 (JP) .............................. JP2021-046029

(51) Int. Cl.
| | |
|---|---|
| *G11B 5/55* | (2006.01) |
| *G11B 20/20* | (2006.01) |
| *G11B 5/596* | (2006.01) |
| *G11B 20/10* | (2006.01) |
| *G11B 20/12* | (2006.01) |

(52) U.S. Cl.
CPC .... *G11B 5/59688* (2013.01); *G11B 20/10314* (2013.01); *G11B 20/1258* (2013.01); *G11B 2020/1272* (2013.01)

(58) Field of Classification Search
CPC ....... G11B 5/54; G11B 5/596; G11B 5/59627; G11B 5/59661; G11B 5/59644; G11B 5/59666; G11B 20/18; G11B 20/20; G11B 5/59633; G11B 5/59638; G11B 5/59655; G11B 5/5539
USPC ........ 360/75, 77.04, 76, 77.05, 77.08, 77.07
See application file for complete search history.

(56) References Cited

U.S. PATENT DOCUMENTS

| | | |
|---|---|---|
| 6,417,983 B1 | 7/2002 | Yatsu |
| 7,251,097 B2 | 7/2007 | Hanson et al. |
| 7,450,336 B1 | 11/2008 | Wang et al. |

(Continued)

*Primary Examiner* — Nabil Z Hindi
(74) *Attorney, Agent, or Firm* — Kim & Stewart LLP

(57) ABSTRACT

A controller for a magnetic disk device acquires a reproduction signal of servo burst data while moving a magnetic head along data tracks that intersect servo tracks at a plurality of points. The controller acquires correction values for correcting repeatable runout on a per servo sector basis based on the reproduction signal. The correction values include a first correction value, which is a correction value for a servo sector at a position where the data track and the servo track are substantially parallel to each other and a second correction value, which is a correction value for a servo sector at a position where the data track and the servo track are not substantially parallel to each other. The controller adjusts the first correction value based on the second correction value, and writes the correction values including the adjusted first correction value onto a magnetic disk.

14 Claims, 14 Drawing Sheets

(56) References Cited

U.S. PATENT DOCUMENTS

| | | | | |
|---|---|---|---|---|
| 8,743,495 B1* | 6/2014 | Chen | ............... | G11B 5/59627 |
| | | | | 360/77.04 |
| 9,460,743 B1* | 10/2016 | Sudo | ............... | G11B 5/59627 |
| 9,953,672 B1* | 4/2018 | Szita | ............... | G11B 5/5547 |
| 2016/0351220 A1* | 12/2016 | Shibata | ............... | G11B 5/59627 |
| 2020/0090691 A1* | 3/2020 | Tagami | ............... | G11B 5/59655 |

* cited by examiner

MAGNETIC DISK DEVICE AND MANUFACTURING METHOD THEREOF

CROSS-REFERENCE TO RELATED APPLICATION(S)

This application is based upon and claims the benefit of priority from Japanese Patent Application No. 2021-046029, filed on Mar. 19, 2021, the entire contents of which are incorporated herein by reference.

FIELD

Embodiments described herein relate generally to a magnetic disk device and a manufacturing method thereof.

BACKGROUND

In the related art, in a magnetic disk device that performs reading and writing to a magnetic disk via a magnetic head, servo burst data defining a plurality of servo tracks is written. The spacing of the servo tracks, i.e., a servo track pitch may be uneven within the magnetic disk. The local deviation of the servo track pitch may cause deterioration in the accuracy in correcting for the amount of positional deviation in the radial direction of the servo tracks, i.e., repeatable runout (RRO).

DETAILED DESCRIPTION

Embodiments provide a magnetic disk device with an improvement in the accuracy of correcting for RRO and a disk device manufacturing method that improves the accuracy of correcting for RRO in the disk device.

In general, according to one embodiment, a magnetic disk device includes a magnetic disk, a magnetic head, and a controller. The magnetic disk has servo burst data recorded on the surface thereof. The servo burst data defines a plurality of servo tracks in the form of concentric circles and a plurality of servo sectors arranged on the plurality of servo tracks along a circumferential direction of the magnetic disk. The controller acquires a reproduction signal of the servo burst data via the magnetic head while moving the magnetic head along a plurality of data tracks, which are in the form of concentric circles. Each of the plurality of data tracks intersects one or more of the servo tracks at a plurality of points. The controller acquires, based on the reproduction signal, correction values for correcting a rotational synchronization component of the amount of positional deviation in the radial direction of the servo tracks. The correction values include a first correction value, which is the correction value for the servo sector located at a first position, and a second correction value, which is the correction value for the servo sector located at a second position. The first position is a position where the data track and the servo track are substantially parallel in the circumferential direction of the magnetic disk. The second position is a position where the data track and the servo track are not substantially parallel in the circumferential direction of the magnetic disk. The controller adjusts the first correction value based on the second correction value, and writes the correction values including the adjusted first correction value onto the magnetic disk.

Hereinafter, a magnetic disk device and a manufacturing method thereof according to embodiments will be described in detail with reference to the accompanying drawings. The present disclosure is not limited by these embodiments.

First Embodiment

Figure 1:
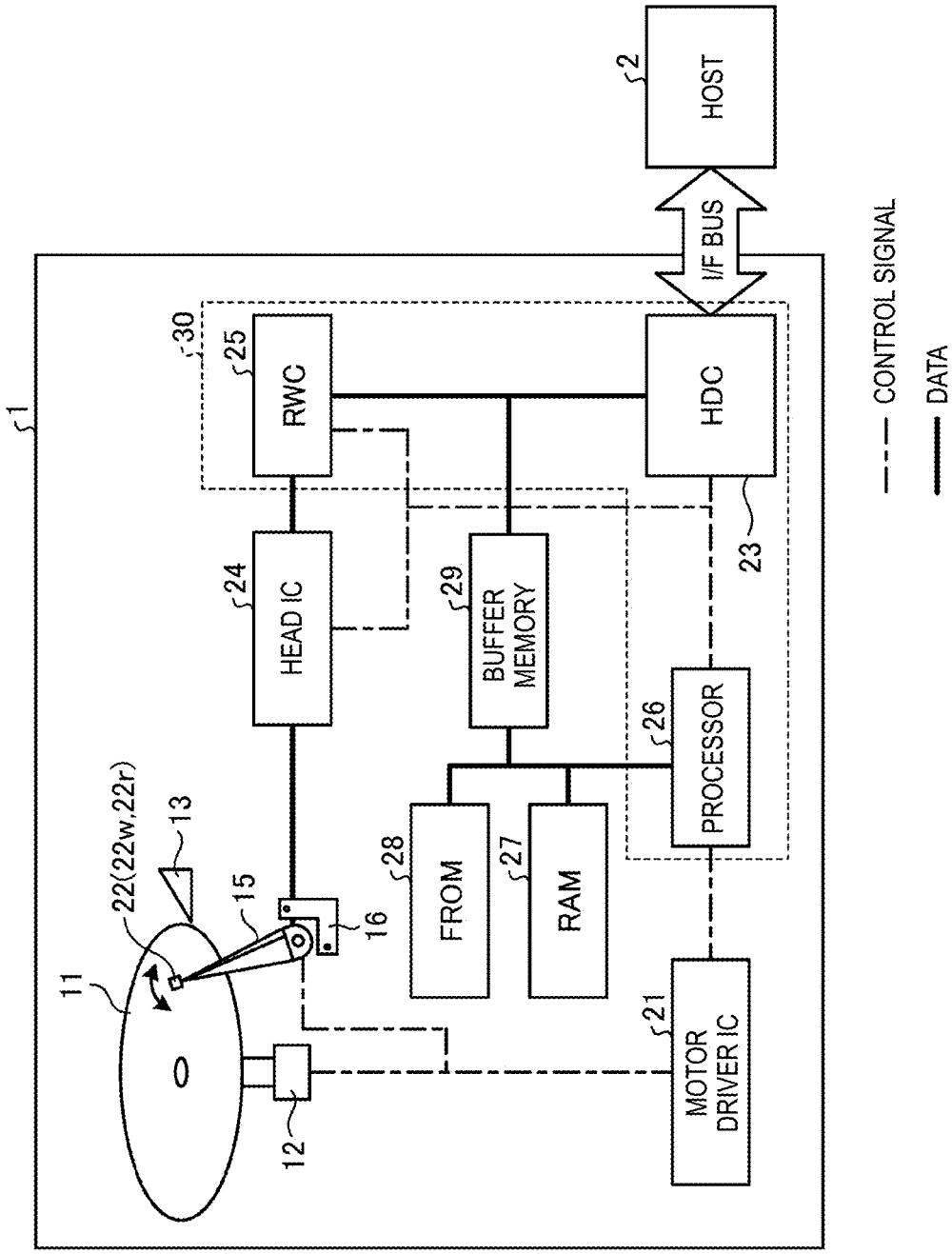
FIG. 1 is a schematic diagram illustrating an example of a configuration of a magnetic disk device according to a first embodiment.

FIG. 1 is a schematic diagram illustrating an example of a configuration of a magnetic disk device 1 according to a first embodiment.

The magnetic disk device 1 is connected to a host 2. The magnetic disk device 1 may receive an access command such as a write command or a read command from the host 2.

The magnetic disk device 1 includes a magnetic disk 11 having a magnetic layer formed on the surface thereof. The magnetic disk device 1 writes information to the magnetic disk 11 or reads information from the magnetic disk 11 in response to the access command.

Recording and reading of data are performed via a magnetic head 22. Specifically, in addition to the magnetic disk 11, the magnetic disk device 1 includes a spindle motor 12, a ramp 13, an actuator arm 15, a voice coil motor (VCM) 16, a motor driver integrated circuit (IC) 21, the magnetic head 22, a hard disk controller (HDC) 23, a head IC 24, a read write channel (RWC) 25, a processor 26, a RAM 27, a flash read only memory (FROM) 28, and a buffer memory 29.

The magnetic disk 11 is rotated at a predetermined rotational speed by the spindle motor 12 mounted on the same shaft. The spindle motor 12 is driven by the motor driver IC 21.

The processor 26 controls the rotation of the spindle motor 12 and the rotation of the VCM 16 via the motor driver IC 21.

The magnetic head 22 may be moved relative to the surface of the magnetic disk 11. Then, the magnetic head 22 writes or reads information to or from the magnetic disk 11 by a write head $22w$ and a read head $22r$ provided therein.

The magnetic head 22 is mounted to the tip of the actuator arm 15. The magnetic head 22 is moved in the radial direction of the magnetic disk 11 relative to the surface of the magnetic disk 11 by the VCM 16 which is driven by the motor driver IC 21. Further, since the magnetic disk 11 is rotating, the magnetic head 22 is moved relative to the surface of the magnetic disk 11 in the circumferential direction of the magnetic disk 11.

For example, when the rotation of the magnetic disk 11 is stopped, the magnetic head 22 is moved on the ramp 13. The ramp 13 is configured to hold the magnetic head 22 at a position separated from the magnetic disk 11.

At the time of reading, the head IC 24 amplifies and outputs a signal read from the magnetic disk 11 by the magnetic head 22, and supplies it to the RWC 25. Further, at the time of recording, the head IC 24 amplifies a signal corresponding to data of a recording target supplied from the RWC 25 and supplies it to the magnetic head 22.

The HDC 23 performs control of data transmission and reception with the host 2 via an I/F bus, control of the buffer memory 29, and an error correction processing of read data.

The buffer memory 29 is used as a buffer for data transmitted to and received from the host 2. For example, the buffer memory 29 is used to temporarily store data to be recorded on the magnetic disk 11 or data read from the magnetic disk 11.

The buffer memory 29 is implemented by, for example, a volatile memory capable of operating at a high speed. The type of a memory configuring the buffer memory 29 is not limited to a specific type. The buffer memory 29 may be implemented by, for example, a dynamic random access memory (DRAM), a static random access memory (SRAM), or a combination thereof.

The RWC 25 modulates data of a recording target supplied from the HDC 23 and supplies it to the head IC 24. Further, the RWC 25 demodulates a signal which is read from the magnetic disk 11 and is supplied from the head IC 24 and outputs it to the HDC 23 as digital data.

The processor 26 is, for example, a central processing unit (CPU). The RAM 27, the flash read only memory (FROM) 28, and the buffer memory 29 are connected to the processor 26.

The FROM 28 is a nonvolatile memory. The FROM 28 stores firmware (program data) and various operation parameters. The firmware may be stored in the magnetic disk 11.

The RAM 27 is implemented by, for example, a DRAM, an SRAM, or a combination thereof. The RAM 27 is used as an operation memory by the processor 26. The RAM 27 is used as an area into which firmware is loaded, or as an area in which various types of management data are held.

The processor 26 performs overall control of the magnetic disk device 1 according to the firmware stored in the FROM 28 or the magnetic disk 11. For example, the processor 26 loads the firmware from the FROM 28 or the magnetic disk 11 into the RAM 27, and according to the loaded firmware, executes control of the motor driver IC 21, the head IC 24, the RWC 25 and HDC 23.

The RWC 25, the processor 26, and the HDC 23 may be referred to as a controller 30. In addition to these, the controller 30 may include any other element (for example, the RAM 27, the FROM 28, the buffer memory 29, or the RWC 25).

Further, a firmware program may be stored in the magnetic disk 11. Further, some or all of the functions of the processor 26 may be implemented by a hardware circuit such as a field programmable gate array (FPGA) or an application specific integrated circuit (ASIC).

Figure 2:
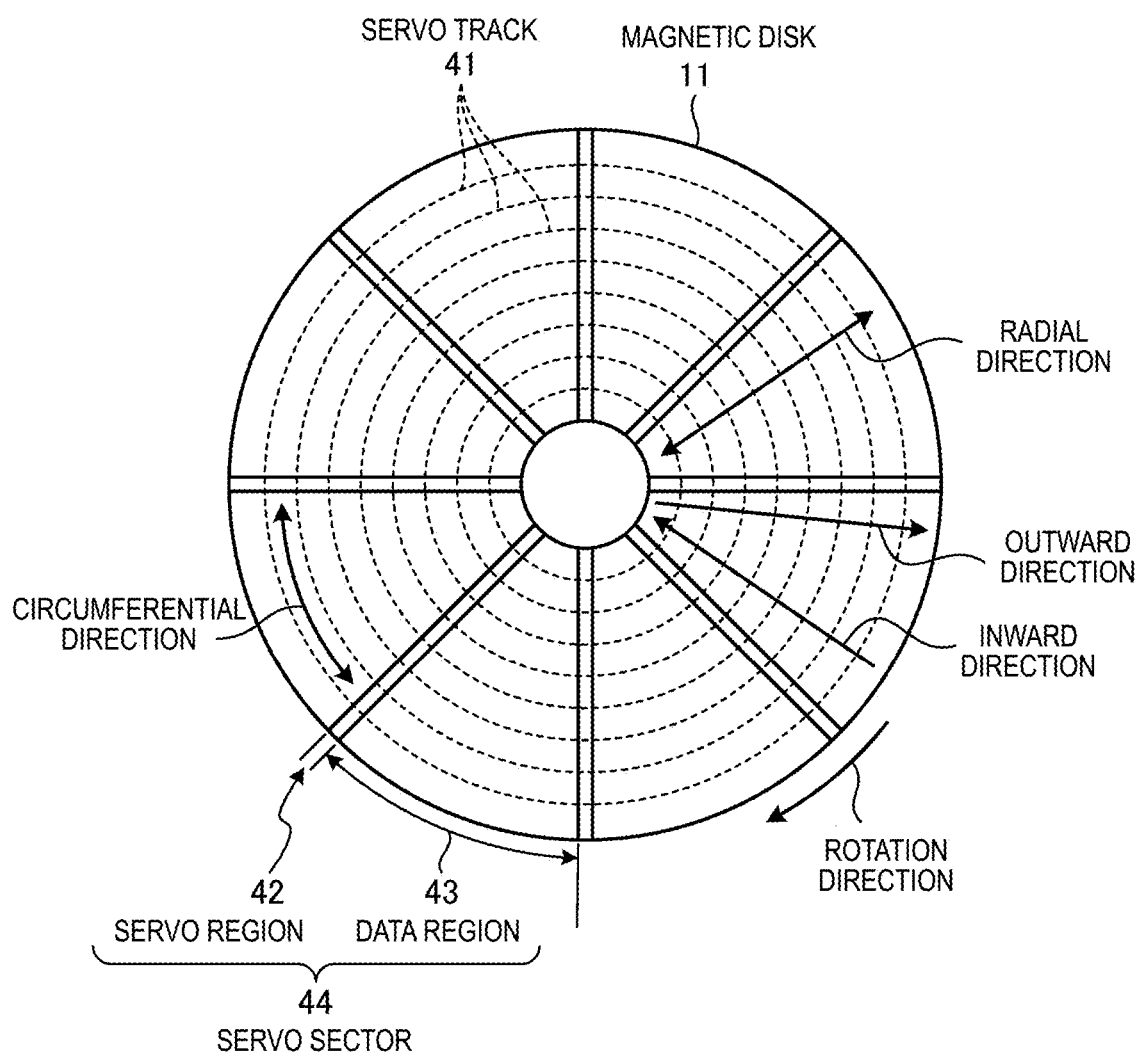
FIG. 2 is a schematic diagram illustrating an example of a configuration of a magnetic disk according to the first embodiment.

FIG. 2 is a schematic diagram illustrating an example of a configuration of the magnetic disk 11 according to the first embodiment. In the magnetic disk 11, with respect to the radial direction, the direction from the outer peripheral side toward the inner peripheral side of the magnetic disk 11 is referred to as the inward direction. The direction from the inner peripheral side toward the outer peripheral side of the magnetic disk 11 is referred to as the outward direction. Further, in FIG. 2, an example of the rotational direction of the magnetic disk 11 is illustrated.

In a manufacturing process, servo information is recorded in the magnetic disk 11. Referring to FIG. 2, servo regions 42 which are arranged radially are illustrated as an example of the arrangement of servo regions in which the servo information is recorded. The servo information will be described later.

A data region 43 to which data may be written is formed between the servo regions 42. One servo region 42 and one data region 43 following that servo region 42 constitute a servo sector 44. A plurality of servo tracks 41 in the form of concentric circles defined by the servo information are set in the radial direction of the magnetic disk 11.

Figure 3:
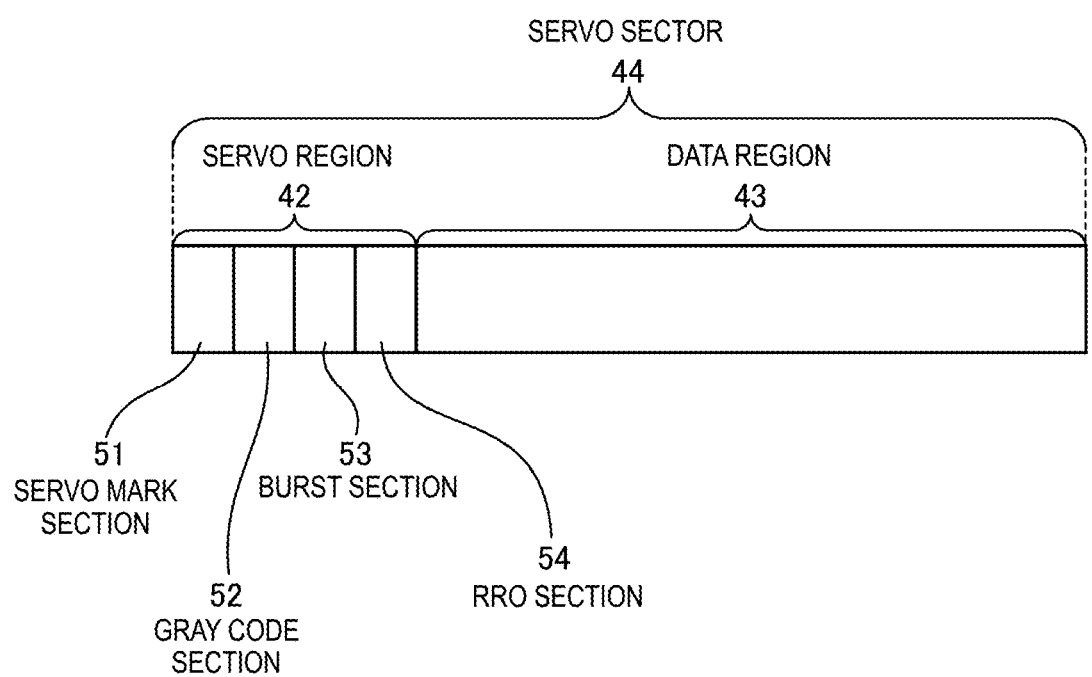
FIG. 3 is a schematic diagram illustrating an example of a more detailed configuration of a servo region according to the first embodiment.

FIG. 3 is a schematic diagram illustrating an example of a more detailed configuration of the servo region 42 according to the first embodiment. As illustrated in this figure, the servo region 42 which constitutes one servo sector 44 together with the data region 43 includes a servo mark section 51, a gray code section 52, a burst section 53, and an RRO section 54.

A servo mark is recorded in the servo mark section 51. The servo mark indicates the head of the servo region 42 in the circumferential direction of the magnetic disk 11.

A gray code is recorded in the gray code section 52. The gray code is digital data indicating a servo track number.

Servo burst data is recorded in the burst section 53. The servo burst data is data for detecting the distance from a track center at the position of the magnetic head 22. By the servo burst data, the track center of each servo track, in other words, each servo track is defined. The servo burst data includes, for example, area patterns of a plurality of phases shifted from each other. An example of the servo burst data will be described later.

RRO correction data is recorded in the RRO section 54. The position of the servo track 41 defined by the servo burst data may be distorted from an ideal shape (for example, a true circle). In such a case, the servo track 41 contains an error caused by radial shaking synchronized with the rotation of the magnetic disk 11. This shaking is called RRO. That is, RRO is a rotational synchronization component of the amount of positional deviation of the servo track 41 in the radial direction. The RRO correction data is data for correcting RRO, and in detail, indicates the correction amount of an error caused by RRO.

In the manufacturing process, the servo mark, the gray code, and the servo burst data are written to the magnetic disk 11 by, for example, a servo writer or self-servo write (SSW). After that, RRO correction data is calculated, and the RRO correction data obtained by the calculation is written to the RRO section 54.

In the first embodiment, a data track is set separately from the plurality of servo tracks 41. The data track is a track on which user data is read and written. A plurality of data tracks are set on the surface of the magnetic disk 11 so that each data track intersects one or more servo tracks 41 at a plurality of points.

Figure 4:
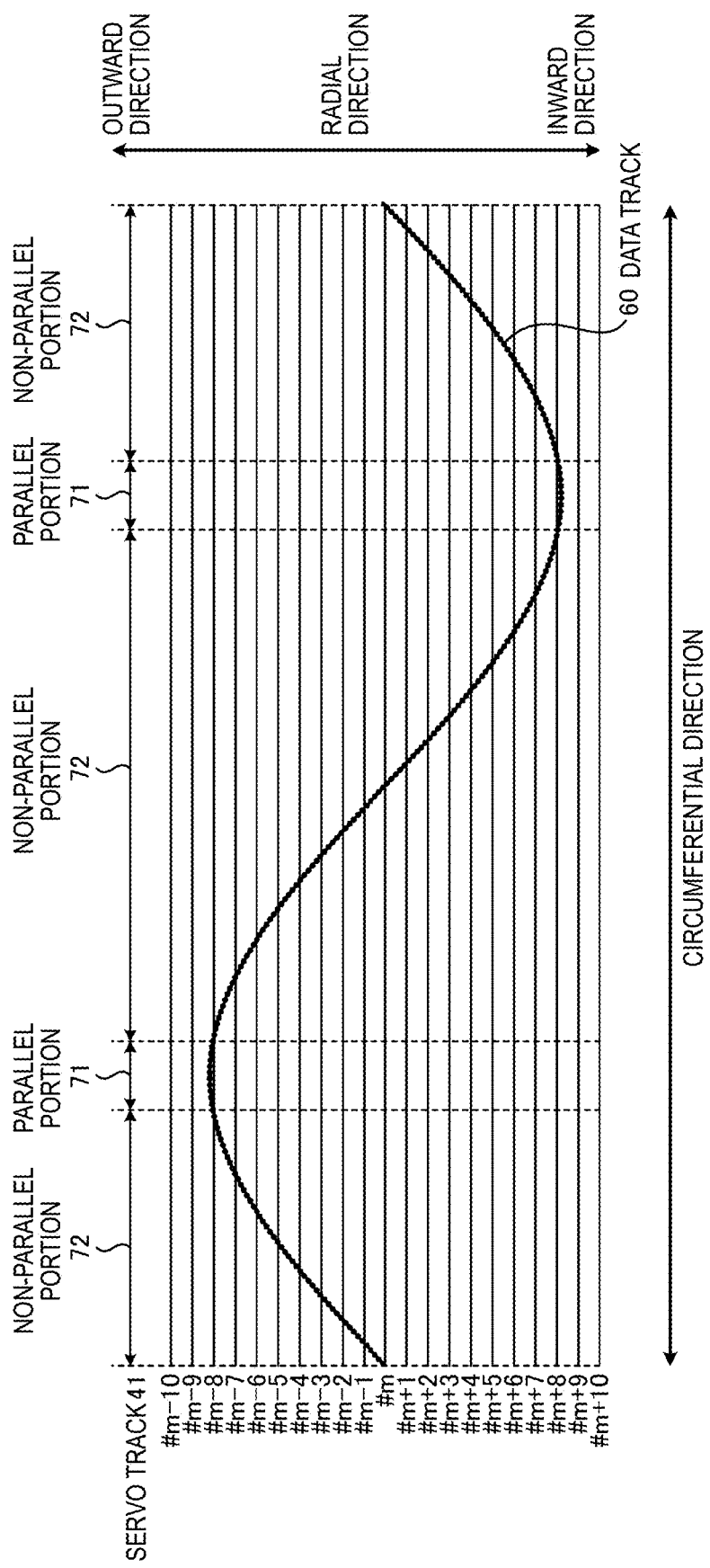
FIG. 4 is a graph illustrating an example of a positional relationship between one data track and a plurality of servo tracks according to the first embodiment.

FIG. 4 is a graph illustrating an example of a positional relationship between one data track and a plurality of servo tracks 41 according to the first embodiment. In this figure, 21 servo tracks 41 which are numbered from m−10 to m+10 are arranged in numerical order in the radial direction of the magnetic disk 11. Here, as an example, it is assumed that the plurality of servo tracks 41 are numbered in ascending order in the inward direction. The plurality of servo tracks 41 may be numbered in ascending order in the outward direction. In the following, the servo track 41 to which the number i is given is sometimes referred to as the servo track #i. Each servo track 41 is represented by a straight line. Thus, in this figure, the circumferential direction of the magnetic disk 11 is represented as a straight line orthogonal to the radial direction. Each of the illustrated servo tracks 41 corresponds to one circumference of the magnetic disk 11. In the circumferential direction, a plurality of servo sectors 44 corresponding to one circumference of each servo track 41 of the magnetic disk 11 are arranged.

In the example illustrated in FIG. 4, a data track 60 is set so that the position thereof in the radial direction of the magnetic disk 11 is displaced according to a sinusoidal wave having an amplitude slightly larger than the total width of 17 servo tracks 41 with the servo track #m being the origin. Thus, the data track 60 intersects the 17 servo tracks 41 which is the sum of the servo tracks #m−8 to #m+8.

In this example, the sinusoidal wave representing the progress of the displacement amount of the data track 60 in the radial direction of the magnetic disk 11 is a primary sinusoidal wave. The order of the sinusoidal wave is the number of cycles of the sinusoidal wave per rotation of the magnetic disk 11. Various cases may be contemplated as a case where the data track 60 is set so that the position of the data track 60 in the radial direction of the magnetic disk 11 is displaced according to the primary sinusoidal wave.

An example of a method of setting the data track so that the position of the data track in the radial direction of the magnetic disk 11 is displaced according to the primary sinusoidal wave will be described with reference to FIG. 5.

Figure 5:
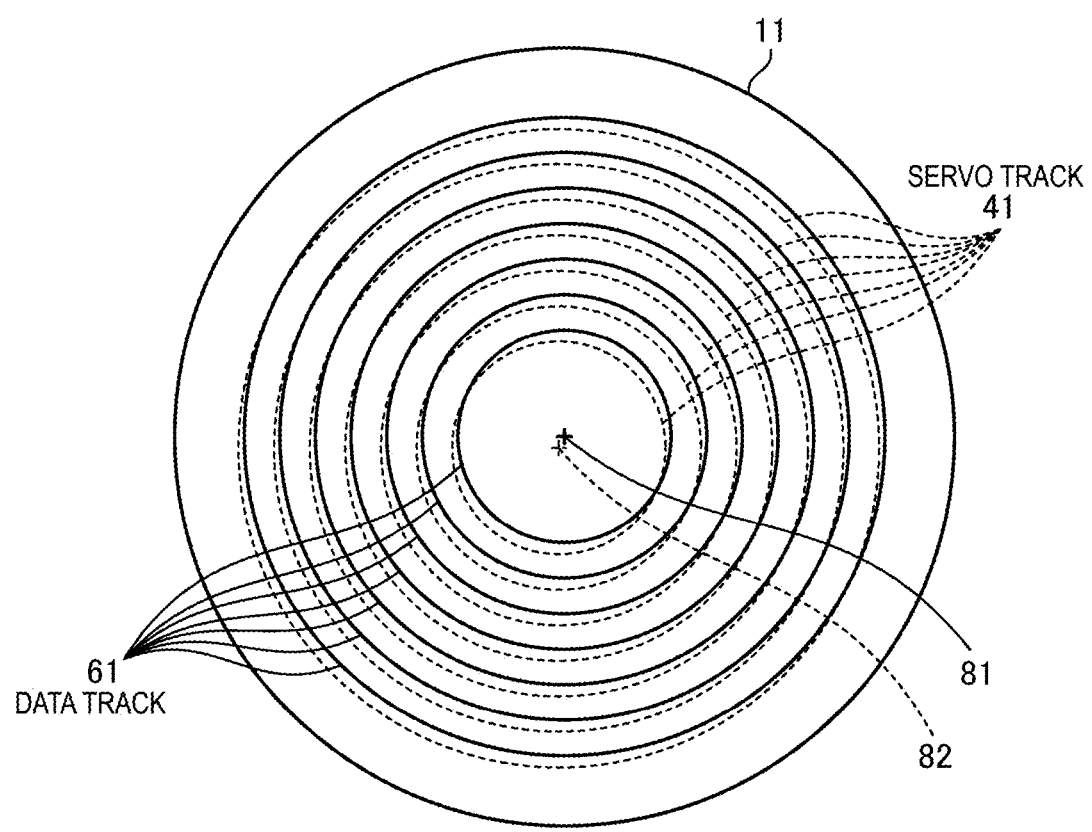
FIG. 5 is a schematic diagram illustrating an example of a method of setting a plurality of data tracks according to the first embodiment.

FIG. 5 is a schematic diagram illustrating an example of a method of setting a plurality of data tracks according to the first embodiment. In the example illustrated in this figure, the plurality of servo tracks 41 are a plurality of concentric circles centered on a position 82 eccentric from a rotation center 81 of the magnetic disk 11. In contrast, a plurality of data tracks 61 are a plurality of concentric circles centered on the rotation center 81. In this way, when the centers of the plurality of data tracks 61 are eccentric from the centers of the plurality of servo tracks 41, the position of each data track 61 in the radial direction of the magnetic disk 11 is displaced in the primary sinusoidal wave on the basis of the plurality of servo tracks 41 like the data track 60 illustrated in FIG. 4. The amplitude of the sinusoidal wave increases as the amount of eccentricity of the centers of the plurality of data tracks 61 from the centers of the plurality of servo tracks 41 increases. As the amplitude of the sinusoidal wave increases, the number of servo tracks 41 at which each data track 61 intersects increases. A designer may determine the amount of eccentricity so that the amplitude of the sinusoidal wave becomes a desired value.

In the example illustrated in FIG. 5, the plurality of data tracks 61 are set so that the centers of the plurality of data tracks 61 coincide with the rotation center 81 of the magnetic disk 11. The centers of the plurality of data tracks 61 and the rotation center 81 of the magnetic disk 11 may not coincide. For example, the plurality of servo tracks 41 may be set so that the centers of the plurality of servo tracks 41 coincide with the rotation center 81 of the magnetic disk 11, and the centers of the plurality of data tracks 61 may be eccentric from the rotation center 81 of the magnetic disk 11. Alternatively, the centers of the plurality of data tracks 61 may be eccentric from the centers of the plurality of servo tracks 41, and both the centers of the plurality of data tracks 61 and the centers of the plurality of servo tracks 41 may be eccentric from the rotation center 81 of the magnetic disk 11.

The controller 30 moves the magnetic head 22 along the plurality of set data tracks 61 relative to the magnetic disk 11 to which the servo mark, the gray code, and the servo burst data are written by controlling the actuator arm 15 and at the same time, acquires a reproduction signal of the servo mark, the gray code, and the servo burst data via the magnetic head 22. Then, the controller 30 acquires RRO correction data of the servo sector 44 through which the magnetic head 22 passes based on the reproduction signal. More specifically, the controller 30 calculates the amount of positional deviation from an ideal track for the position of the magnetic head 22 detected based on the acquired reproduction signal, and calculates RRO from the calculated amount of positional deviation to acquire the calculated RRO as RRO correction data. The controller 30 acquires the RRO correction data for each servo sector 44 through which the magnetic head 22 passes. The ideal track may be, for example, one of the plurality of data tracks 61, or may not be any of the data tracks 61. The ideal track may be a track in which the servo track 41 is corrected to a true circle. It can be said that acquiring the RRO correction data is computing the RRO correction data or learning the RRO correction data.

The spacing of the plurality of servo tracks 41 defined by the servo burst data, i.e., a servo track pitch cannot be said to be uniform within the magnetic disk 11. The servo track pitch is sometimes distributed locally within the magnetic disk 11. As illustrated in FIGS. 4 and 5, when the position of each data track 61 in the radial direction of the magnetic disk 11 is displaced according to the sinusoidal wave on the basis of the plurality of servo tracks 41, the accuracy of the RRO correction data is deteriorated due to the deviation of the servo track pitch in a specified portion in the circumferential direction.

In the example illustrated in FIG. 4, in a portion where the phase of the displacement of the data track 61, i.e., the phase of the sinusoidal wave is (½) Pi [rad] or (3/2)Pi[rad], the data track 61 is parallel to the servo track 41. This portion is referred to as a parallel portion 71. Here, Pi is the ratio of the circumference of a circle to its diameter. The "parallel" does not need to be strictly parallel. Even if the angle between the data track 61 and the servo track 41 is not necessarily 0 [rad], the data track 61 may be regarded as parallel to the servo track 41 when the angle is sufficiently small.

In a portion where the data track 61 is parallel to the servo track 41 such as the parallel portion 71, the accuracy of the RRO correction data is deteriorated due to the deviation of the servo track pitch. In contrast, in a portion where the data track 61 is not parallel to the servo track 41, it is possible to acquire the RRO correction data in consideration of the deviation of the servo track pitch. This portion is referred to as a non-parallel portion 72. In the non-parallel portion 72, deterioration in the accuracy of the RRO correction data due to the deviation of the servo track pitch is reduced.

The position of the servo sector 44 in the parallel portion 71 is referred to herein as a first position. The position of the servo sector 44 in the non-parallel portion 72 is referred to herein as a second position. A difference in the influence of the deviation of the servo track pitch on the accuracy of the RRO correction data between the parallel portion 71 and the non-parallel portion 72 will be described with reference to FIGS. 6 and 7.

Figure 6:
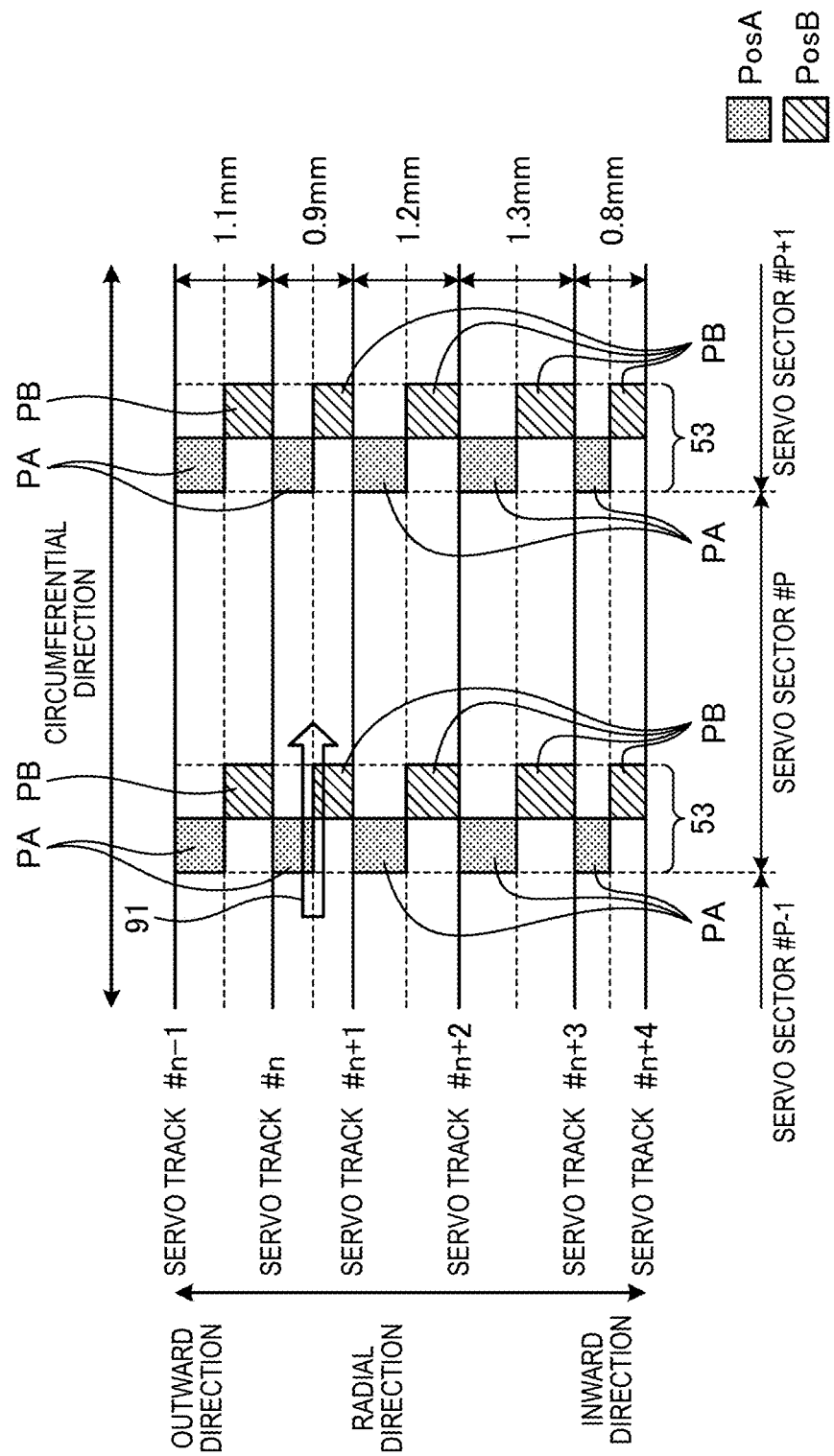
FIG. 6 is a schematic diagram illustrating an example of a relationship between servo burst data and the movement path of a magnetic head in a parallel portion associated with the first embodiment.
Figure 7:
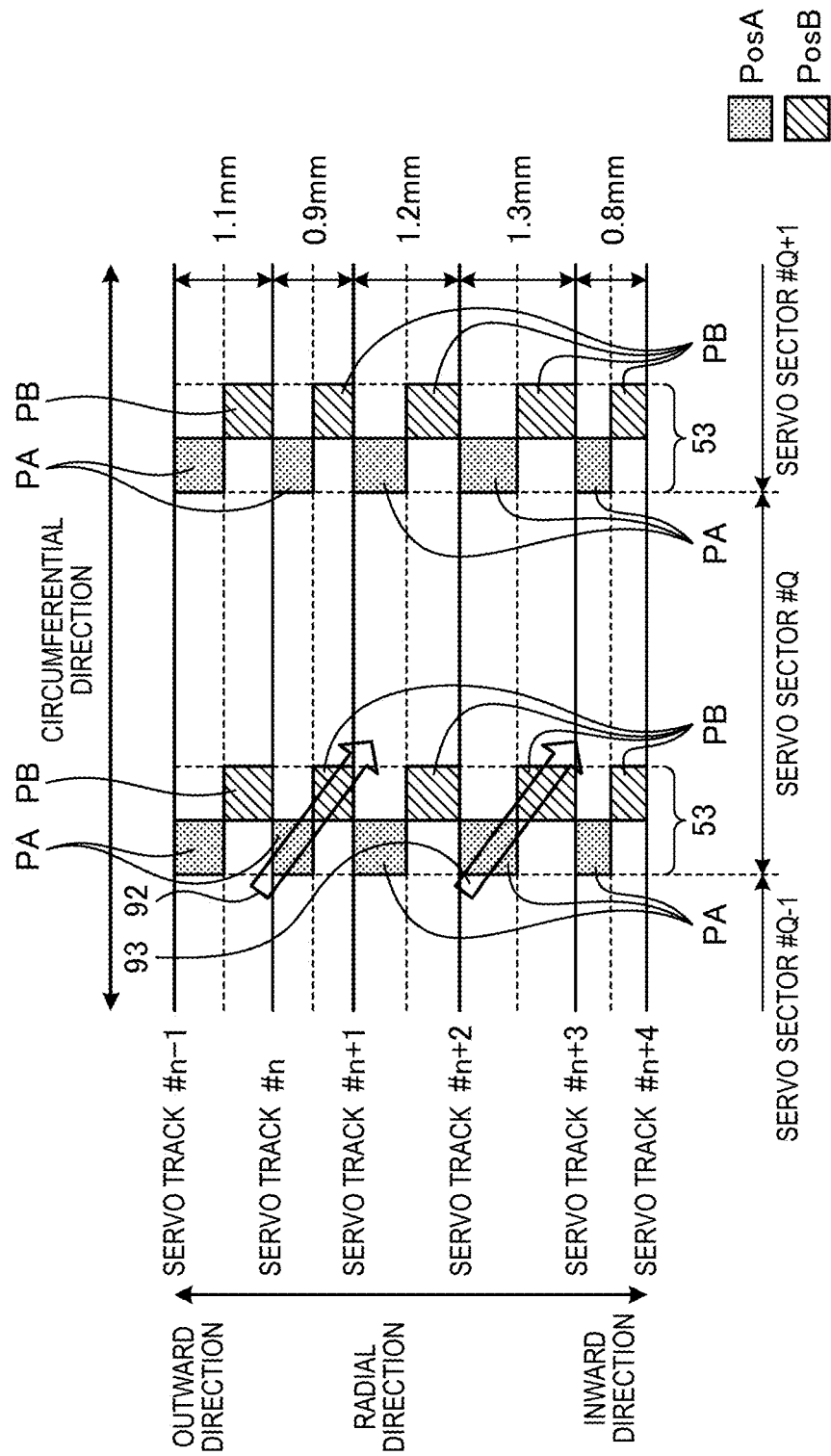
FIG. 7 is a schematic diagram illustrating an example of a relationship between servo burst data and the movement path of the magnetic head in a non-parallel portion associated with the first embodiment.

FIG. 6 is a schematic diagram illustrating an example of a relationship between servo burst data and the movement path of the magnetic head 22 in the parallel portion 71 associated with the first embodiment. FIG. 7 is a schematic diagram illustrating an example of a relationship between servo burst data and the movement path of the magnetic head 22 in the non-parallel portion 72 associated with the first embodiment. FIGS. 6 and 7 illustrate different portions of the same magnetic disk 11.

In the examples illustrated in FIGS. 6 and 7, the servo burst data includes two-phase area patterns in which phases are shifted from each other by Pi [rad]. One of the two-phase area patterns is a burst pattern PosA, and the other one of the two-phase area patterns is a burst pattern PosB. Each burst pattern includes a plurality of rectangular patterns arranged in the radial direction. Two sides of each rectangular pattern are parallel in the circumferential direction, and the other two sides of each rectangular pattern are parallel in the radial direction. One servo track 41 is defined by a pair of one rectangular pattern PA included in the burst pattern PosA and one rectangular pattern PB included in the burst pattern PosB which is located closest to the one rectangular pattern PA. Another pair of the rectangular pattern PA and the rectangular pattern PB adjacent to the pair defining one servo track 41 in the radial direction defines another servo track 41. The boundary of the two pairs adjacent to each other represents the boundary of two servo tracks 41 adjacent to each other.

In FIGS. 6 and 7, servo tracks #n−1 to #n+4 defined by the burst pattern PosA and the burst pattern PosB are drawn. The solid lines drawn parallel in the circumferential direction represent the track centers of the servo tracks 41, and the dotted lines drawn parallel in the circumferential direction represent the boundaries between the servo tracks 41.

Even if the burst pattern PosA and the burst pattern PosB are written so that the servo track pitch becomes uniform within the magnetic disk 11, the burst pattern PosA and the burst pattern PosB are distorted due to various factors. Then, due to the distortion of the burst pattern PosA and the burst pattern PosB, the servo track pitch of the servo tracks #n−1 to #n+3 becomes non-uniform.

In this example, the servo track pitch between the servo track #n−1 and the servo track #n is 1.1 mm, the servo track pitch between the servo track #n and the servo track #n+1 is 0.9 mm, the servo track pitch between the servo track #n+1 and the servo track #n+2 is 1.2 mm, the servo track pitch between the servo track #n+2 and the servo track #n+3 is 1.3 mm, and the servo track pitch between the servo track #n+3 and the servo track #n+4 is 0.8 mm. However, in this example, it is assumed that each burst pattern is written with the intention that the servo track pitch has a uniform value of 1.0 mm.

That is, it can be seen from FIGS. 6 and 7 that, even when each burst pattern is written with the intention that the servo track pitch has a uniform value of 1.0 mm, the actual servo track pitch becomes non-uniform between 0.8 mm and 1.3 mm.

Thereafter, the intended servo track pitch (1.0 mm in this case) is referred to as the ideal value of the servo track pitch. Further, the actual servo track pitch defined by the recorded servo burst data is referred to as the actual value of the servo track pitch.

The controller 30 may calculate the distance from the track center at the position of the magnetic head 22 using the amplitude of a reproduction signal of the burst pattern PosA and a change in that amplitude as well as the amplitude of a reproduction signal of the burst pattern PosB and a change in that amplitude.

In the parallel portion 71, for example, the magnetic head 22 moves parallel to the servo track 41 as illustrated in a path 91 of FIG. 6. In such a case, while the magnetic head 22 passes over the rectangular pattern PA, the amplitude of the reproduction signal of the rectangular pattern PA does not change. Similarly, while the magnetic head 22 passes over the rectangular pattern PB, the amplitude of the reproduction signal of the rectangular pattern PB does not change. This is because two sides of each rectangular pattern are parallel in the circumferential direction and the other two sides of each rectangular pattern are parallel in the radial direction.

As described above, in the parallel portion 71, since the amplitude of the reproduction signal of each burst data becomes constant, the controller 30 may not use information on the amplitude change of the reproduction signal of each burst data for the detection of the distance from the track center at the position of the magnetic head 22.

Specifically, in the parallel portion 71, when the magnetic head 22 passes through the burst section 53, the controller 30 acquires the reproduction signal of the burst pattern PosA which progresses with a constant amplitude and subsequently, acquires the reproduction signal of the burst pattern PosB which progresses with a constant amplitude. Once these reproduction signals are acquired, the controller 30 may detect the distance from the track center at the position of the magnetic head 22 as the ratio to the servo track pitch from the ratio of the amplitude of the reproduction signal of the burst pattern PosA and the amplitude of the reproduction signal of the burst pattern PosB. However, the controller 30 does not know the actual value of the servo track pitch. Thus, the controller 30 may convert the distance from the track center at the position of the magnetic head 22 into numerical information having a length dimension, for example, by multiplying the detected ratio by the ideal value of the servo track pitch.

The path 91 in FIG. 6 is a path along which the magnetic head 22 passes through the boundary between the servo track #n and the servo track #n+1 in the burst section 53 of a servo sector #p. Since the actual value of the servo track pitch between the servo track #n and the servo track #n+1 is 0.9 mm, the magnetic head 22 passes through a position that is separated in the inward direction from the track center of the servo track #n by only 0.45 mm in the path 91. When the magnetic head 22 passes through the burst section 53 of the servo sector #p along the path 91, the ratio between the amplitude of the reproduction signal of the burst pattern PosA and the amplitude of the reproduction signal of the burst pattern PosB acquired by the controller 30 is 1:1. In such a case, the controller 30 may detect that the position of the magnetic head 22 is separated by 0.5 track from the track center when the magnetic head 22 passes between the servo track #n and the servo track #n+1. Then, the controller 30 multiplies, for example, 1.0 mm which is the ideal value of the servo track pitch by 0.5 which is the detected ratio, thereby acquiring a value of 0.5 mm as the distance from the track center at the position of the magnetic head 22. This acquired value deviates from the actual distance of 0.45 mm.

As described above, in the parallel portion 71, the controller 30 may not detect the distance from the track center at the position of the magnetic head 22 in consideration of the deviation of the servo track pitch. In the parallel portion 71, the accuracy of the detected position of the magnetic head 22 is deteriorated and therefore, the accuracy of the RRO correction data calculated based on the position of the magnetic head 22 is deteriorated.

A path 92 in FIG. 7 is a path along which the magnetic head 22 passes through the boundary between the servo track #n and the servo track #n+1 in the burst section 53 of a servo sector #q. Since the actual value of the servo track pitch between the servo track #n and the servo track #n+1 is 0.9 mm, the magnetic head 22 passes through a position that is separated in the inward direction from the track center of the servo track #n by only 0.45 mm in the path 92. However, in a case of the path 92, unlike the path 91 illustrated in FIG. 6, the magnetic head 22 obliquely traverses the rectangular pattern PA and the rectangular pattern PB. As a result, the amplitude of the reproduction signal of each burst data becomes non-uniform.

The amplitude change of the reproduction signal of each burst data depends on the actual value of the servo track pitch. The actual value of the servo track pitch is defined by the shape of the rectangular pattern PA and the rectangular pattern PB arranged between the servo tracks 41, more particularly, the length thereof in the radial direction. When the magnetic head 22 obliquely traverses the rectangular pattern PA and the rectangular pattern PB, the amplitude change of the reproduction signal reflects the shape of the rectangular pattern PA and the rectangular pattern PB.

For example, a path 93 along which the magnetic head 22 passes through the boundary between the servo track #n+2 and the servo track #n+3 in the servo sector #q in the radial direction at the same speed as when the magnetic head 22 moves along the path 92 is contemplated. The rectangular pattern PA and the rectangular pattern PB between the servo track #n+2 and the servo track #n+3 have a longer radial length compared to the rectangular pattern PA and the rectangular pattern PB between the servo track #n and the servo track #n+1. Thus, the actual value of the servo track pitch between the servo track #n+2 and the servo track #n+3 is 1.3 mm that is longer than 0.9 mm which is the actual value of the servo track pitch between the servo track #n and the servo track #n+1.

Since the shape of the rectangular patterns PA and PB through which the magnetic head 22 passes varies between the path 92 and the path 93 and since the magnetic head 22 obliquely passes through the rectangular patterns PA and PB, the amplitude change of the reproduction signal of the burst pattern PosA and the amplitude change of the reproduction signal of the burst pattern PosB vary between when the magnetic head 22 moves along the path 92 and when the magnetic head 22 moves along the path 93. The amplitude change of the reproduction signal of the burst pattern PosA and the amplitude change of the reproduction signal of the burst pattern PosB depend on the actual value of the servo track pitch. Thus, in the non-parallel portion 72, the controller 30 may detect the distance from the track center at the position of the magnetic head 22 by taking the actual value of the servo track pitch into consideration. Accordingly, in the non-parallel portion 72, deterioration in the accuracy of the RRO correction data due to the deviation of the track pitch is reduced compared to the parallel portion 71.

The servo burst data illustrated in FIGS. 6 and 7 is an example. The number of burst data constituting the servo burst data is not limited to two. Further, the shape of the pattern constituting each burst data is not limited to the examples illustrated in FIGS. 6 and 7.

Further, the method of detecting the position of the magnetic head 22 in the parallel portion 71 and the non-parallel portion 72 is not limited to the examples described with reference to FIGS. 6 and 7.

In the first embodiment, the controller 30 corrects the RRO correction data of the servo sector located in the parallel portion 71 based on the RRO correction data of the servo sector located in the non-parallel portion 72. Thus, deterioration in the accuracy of the RRO correction data of the servo sector located in the parallel portion 71 is reduced. An operation of processing the RRO correction data by the controller 30 will be described with reference to FIGS. 8 to 13.

Figure 8:
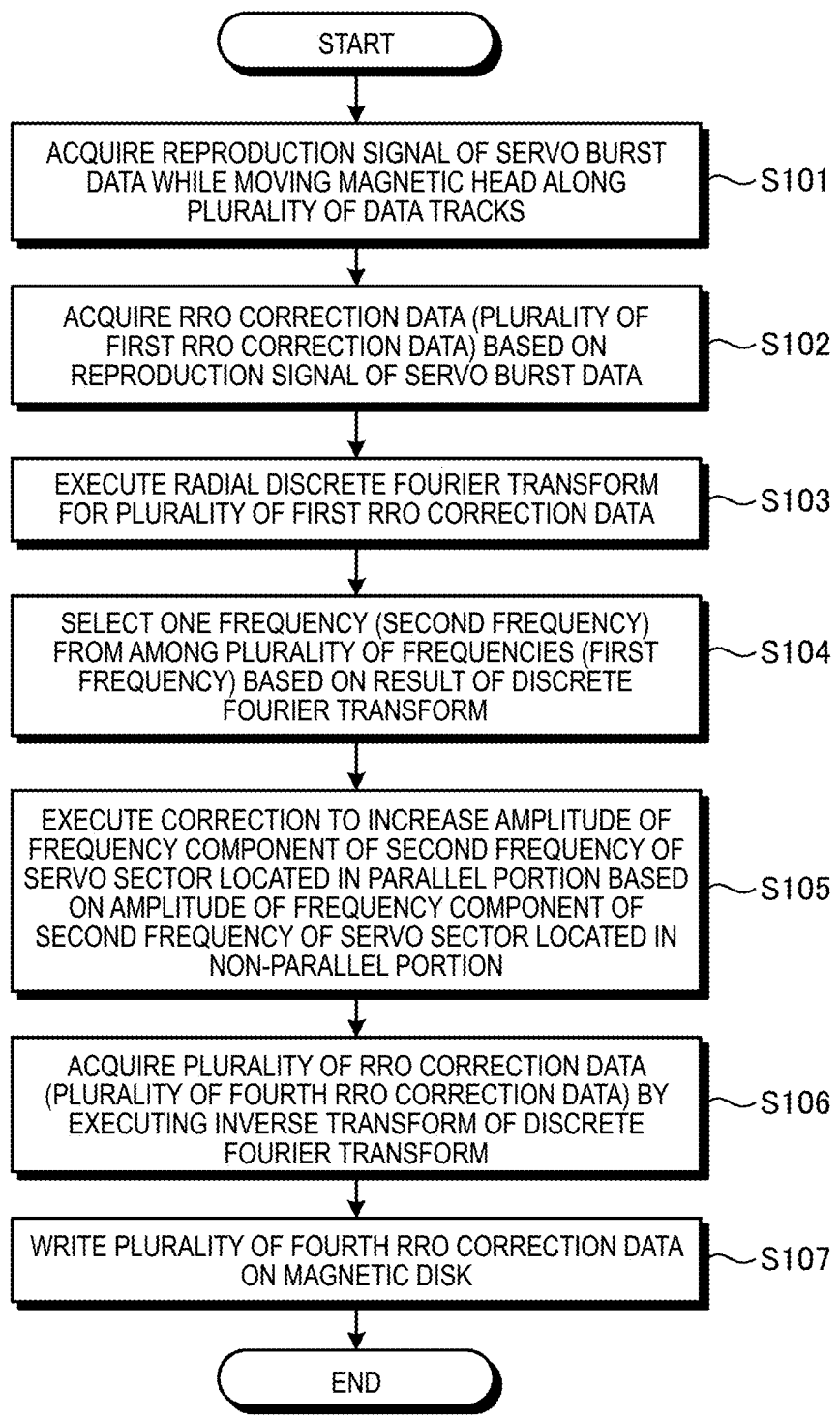
FIG. 8 is a flowchart illustrating an example of an operation of a controller according to the first embodiment.

FIG. 8 is a flowchart illustrating an example of an operation of the controller 30 according to the first embodiment. This operation is executed during the manufacturing process of the magnetic disk device 1. More specifically, this operation is executed after the assembly of the magnetic disk device 1 is completed. This operation may be implemented by the processor 26 installed in the controller 30 executing firmware. A part or entirety of this operation may be implemented by the RWC 25 or the HDC 23. It is assumed that the servo mark, the gray code, and the servo burst data are already written to the magnetic disk 11 at the start of this operation. Recording of the servo mark, the gray code, and the servo burst data may be executed by a servo writer before the magnetic disk 11 is assembled to the magnetic disk device 1. Alternatively, recording of the servo mark, the gray code, and the servo burst data may be executed under the control of the controller 30 after the magnetic disk 11 is assembled to the magnetic disk device 1. The latter writing method is called self-servo write (SSW).

First, the controller 30 acquires the reproduction signal of the servo burst data via the magnetic head 22 while moving the magnetic head 22 along the plurality of data tracks 61 (S101). The reproduction signal of the servo burst data is acquired each time the magnetic head 22 passes through the burst section 53. That is, the controller 30 acquires the reproduction signal of the servo burst data on a per servo sector 44 basis.

The controller 30 acquires the RRO correction data based on the acquired reproduction signal of the servo burst data (S102). For example, the controller 30 calculates the RRO of the servo track 41 based on the reproduction signal of the servo burst data, and uses the RRO of the servo track 41 obtained by the calculation as the RRO correction data. The controller 30 acquires the RRO correction data on a per servo sector basis.

The RRO correction data acquired on a per servo sector basis in S102 is referred to herein as a first correction value. By S102, a plurality of first correction values are acquired. Thereafter, each RRO correction data acquired by S102 is referred to as first RRO correction data.

Figure 9:
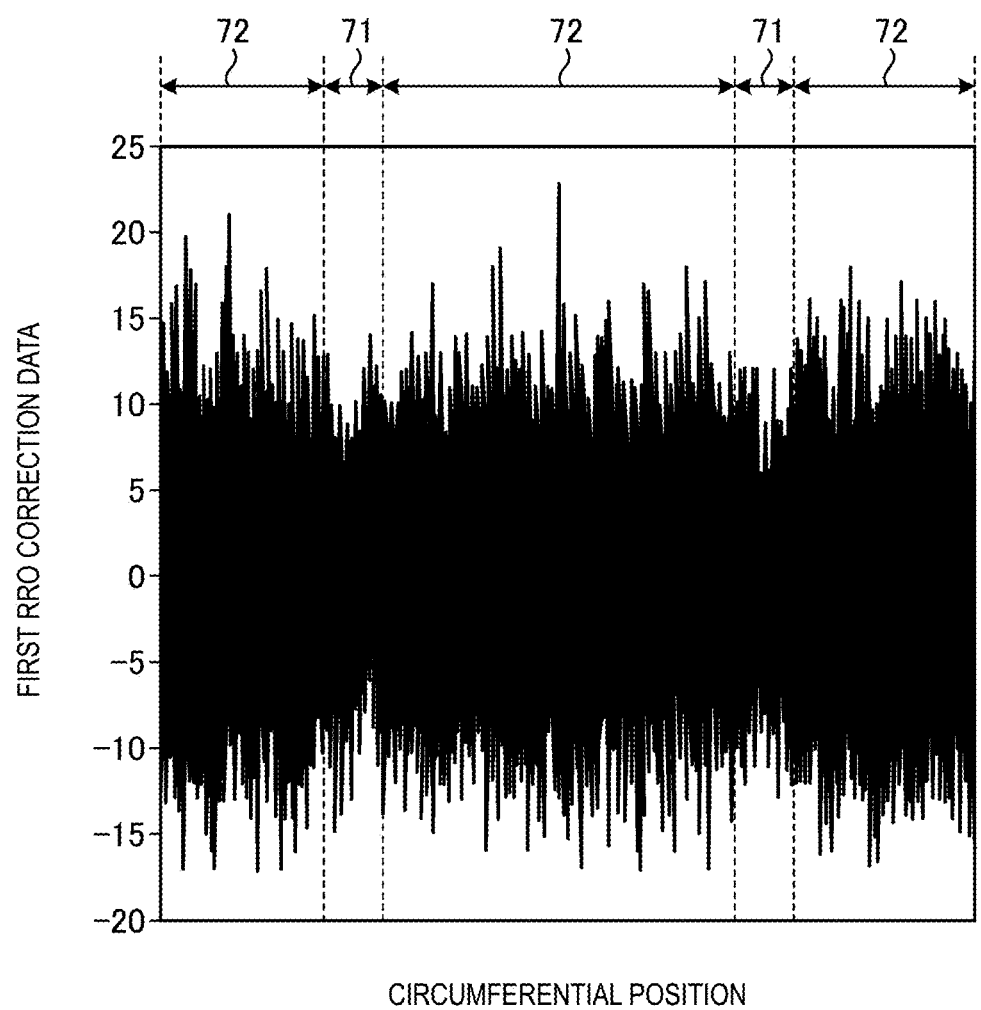
FIG. 9 is a diagram illustrating an example of a plurality of first RRO correction data obtained by the processing according to the first embodiment.

FIG. 9 is a diagram illustrating an example of a plurality of first RRO correction data obtained by the processing of S102 according to the first embodiment. The vertical axis represents the first RRO correction data. Numerical values attached to the vertical axis are given as an example to express the magnitude of the RRO correction data, and that magnitude is common to FIGS. 12 and 13 to be described later. The horizontal axis represents the position in the circumferential direction of the magnetic disk 11. Regarding the horizontal axis, for convenience, the position at which the phase of the primary sinusoidal wave along the data track 61 becomes 0 [rad] in the circumferential direction is the origin. That is, the horizontal axis may also be regarded as the phase of the displacement of the data track 61 (i.e., the phase of the sinusoidal wave).

In FIG. 9, lines for each data track 61 are drawn to overlap each other for the plurality of data tracks 61. One line represents a first RRO correction data group acquired for each servo sector 44 from one data track 61. That is, in FIG. 9, the first RRO correction data group is drawn for each of the plurality of data tracks 61 along which the magnetic head 22 is moved in S101.

It can be seen from FIG. 9 that the absolute value of the first RRO correction data in the parallel portion 71 is relatively smaller than that of the non-parallel portion 72. This is because, in the parallel portion 71, the first RRO correction data has no component resulting from the deviation of the servo track pitch.

The description will be referred back to FIG. 8.

Following the processing of S102, the controller 30 executes a discrete Fourier transform in the radial direction on the plurality of first RRO correction data (S103). Thus, the controller 30 converts the plurality of first RRO correction data into one or more frequency component groups having different frequencies, respectively. The controller 30 performs the discrete Fourier transform in the radial direction for each position of the servo sector 44 in the circumferential direction of the magnetic disk 11 and as a result, acquires one or more frequency component groups for each servo sector 44 in the circumferential direction of the magnetic disk 11. Each frequency component is a vibration function. The vibration function includes a frequency, an amplitude, and an initial phase.

The discrete Fourier transform is an example of a frequency analysis processing. The frequency analysis processing is not limited to this. For example, it is possible to employ a fast Fourier transform as the frequency analysis processing.

Following the processing of S103, the controller 30 selects one frequency from among a plurality of frequencies based on the discrete Fourier transform result (S104). Each of the plurality of frequencies is an example of a first frequency. The frequency selected by S104 is an example of a second frequency.

Figure 10:
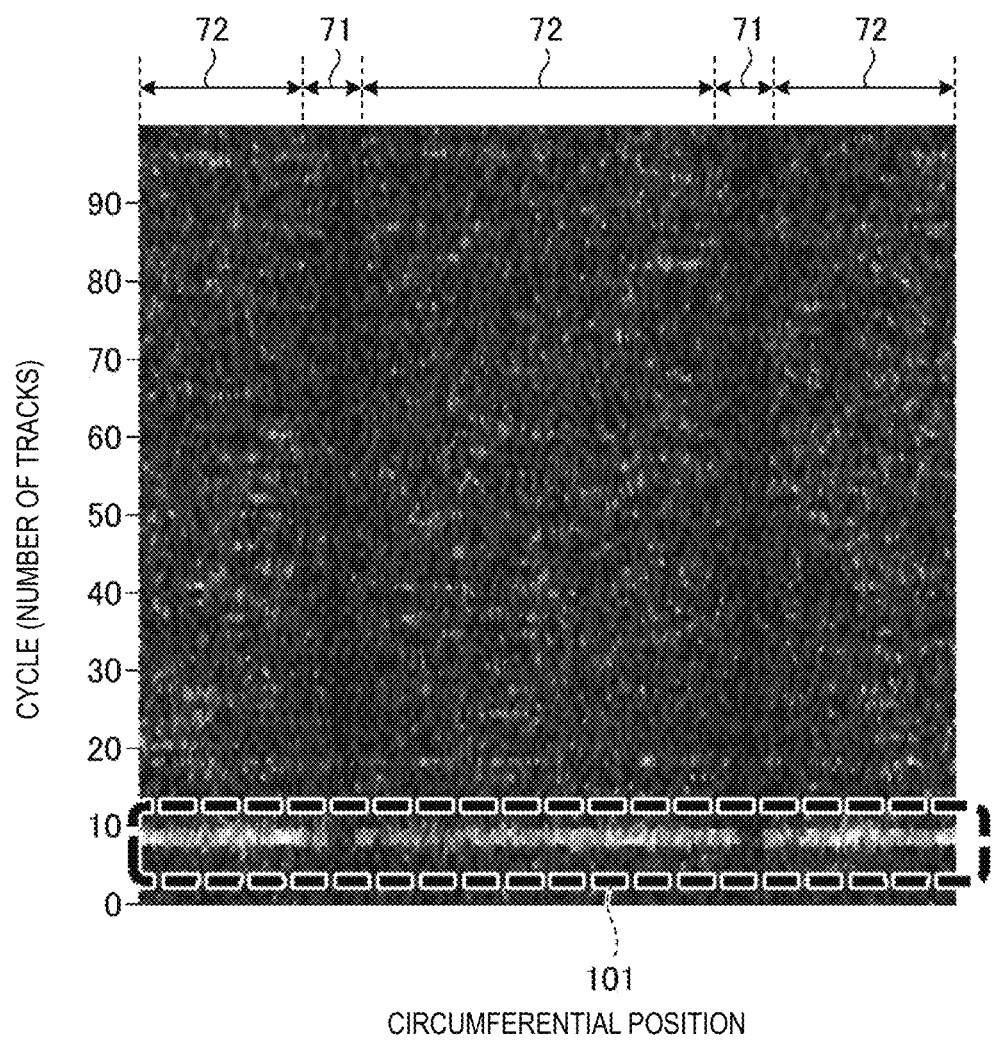
FIG. 10 is a diagram illustrating an example of the discrete Fourier transform result obtained by the processing according to the first embodiment.

FIG. 10 is a diagram illustrating an example of the discrete Fourier transform result obtained by the processing of S103 according to the first embodiment. The vertical axis represents the cycle by the number of tracks (more specifically, the servo tracks 41). That is, the vertical axis corresponds to the reciprocal number of the plurality of first frequencies. Like FIG. 9, the horizontal axis represents the position in the circumferential direction of the magnetic disk 11. Then, in FIG. 10, the amplitude of the frequency component for each first frequency is drawn as colors. Here, as the amplitude increases, the color becomes whiter, and as the amplitude decreases, the color becomes darker.

It can be seen from FIG. 10 that the amplitude at a frequency with 10 tracks as one cycle, i.e., the amplitude drawn in the region denoted by reference numeral 101 protrudes from and is larger than the amplitudes at other frequencies. The controller 30 selects, for example, the frequency with 10 tracks as one cycle as a second frequency.

The method of selecting the second frequency may be freely selected. In one example, when there is a frequency component having an amplitude exceeding the criterion, the controller 30 selects the frequency having that frequency component as the second frequency. The criterion may be defined as a fixed threshold. That is, the frequency of a frequency component at which vibrations exceed the threshold is selected as the second frequency. The threshold may be set based on the discrete Fourier transform result. For example, the threshold may be the average value of the amplitudes of all frequency components of all servo sectors 44 or an intermediate value between the maximum value and the minimum value.

In addition, the amplitude at the frequency with 10 tracks as one cycle is large in the non-parallel portion 72 and is small in the parallel portion 71. This means that the first RRO correction data in the non-parallel portion 72 contains the frequency component with 10 tracks as one cycle which results from the deviation of the servo track pitch as a particularly large component, whereas that frequency component is insufficient in the first RRO correction data in the parallel portion 71. In a processing following S104, correction to supplement for the frequency component insufficient in the first RRO correction data in the parallel portion 71 is executed by the controller 30.

The description will be referred to FIG. 8.

Following the processing of S104, the controller 30 increases the amplitude of the frequency component of the second frequency of the servo sector 44 located in the parallel portion 71 based on the amplitude of the frequency component of the second frequency of the servo sector 44 located in the non-parallel portion 72.

A specific method of the processing of S105 is not limited to the specific method. In one example, the controller 30 selects one of the servo sectors 44 located in the non-parallel portion 72. For example, the servo sector 44 located at a position where the phase of the displacement of the data track 61 (i.e., the phase of the sinusoidal wave) has a preset value, for example, 0 [rad] or Pi [rad] is selected. Then, the controller 30 acquires the amplitude of the frequency component of the second frequency in the selected servo sector 44, and sets the acquired amplitude to the amplitude of the frequency component of the second frequency of the servo sector 44 located in the parallel portion 71. Thus, the amplitude of the frequency component of the second frequency of the servo sector 44 located in the parallel portion 71 may be increased based on the amplitude of the frequency component of the second frequency of the servo sector 44 located in the non-parallel portion 72.

Alternatively, the controller 30 calculates the average value of the amplitudes of the frequency components of the second frequencies of the servo sectors 44 for the entire circumference, and sets the obtained average value to the amplitude of the frequency component of the second frequency of the servo sector 44 located in the parallel portion 71. Thus, the amplitude of the frequency component of the second frequency of the servo sector 44 located in the parallel portion 71 may be increased based on at least the amplitude of the frequency component of the second frequency of the servo sector 44 located in the non-parallel portion 72.

Increasing the amplitude of the frequency component the second frequency of the servo sector 44 located in the parallel portion 71 based on the amplitude of the frequency component of the second frequency of the servo sector 44 located in the non-parallel portion 72 corresponds to correcting second RRO correction data based on third RRO correction data in a time domain. The second RRO correction data is the first RRO correction data of the servo sector 44 located in the parallel portion 71. The second RRO correction data is an example of a second correction value. The third RRO correction data is the first RRO correction data of the servo sector 44 located in the non-parallel portion 72. The third RRO correction data is an example of a third correction value.

Figure 11:
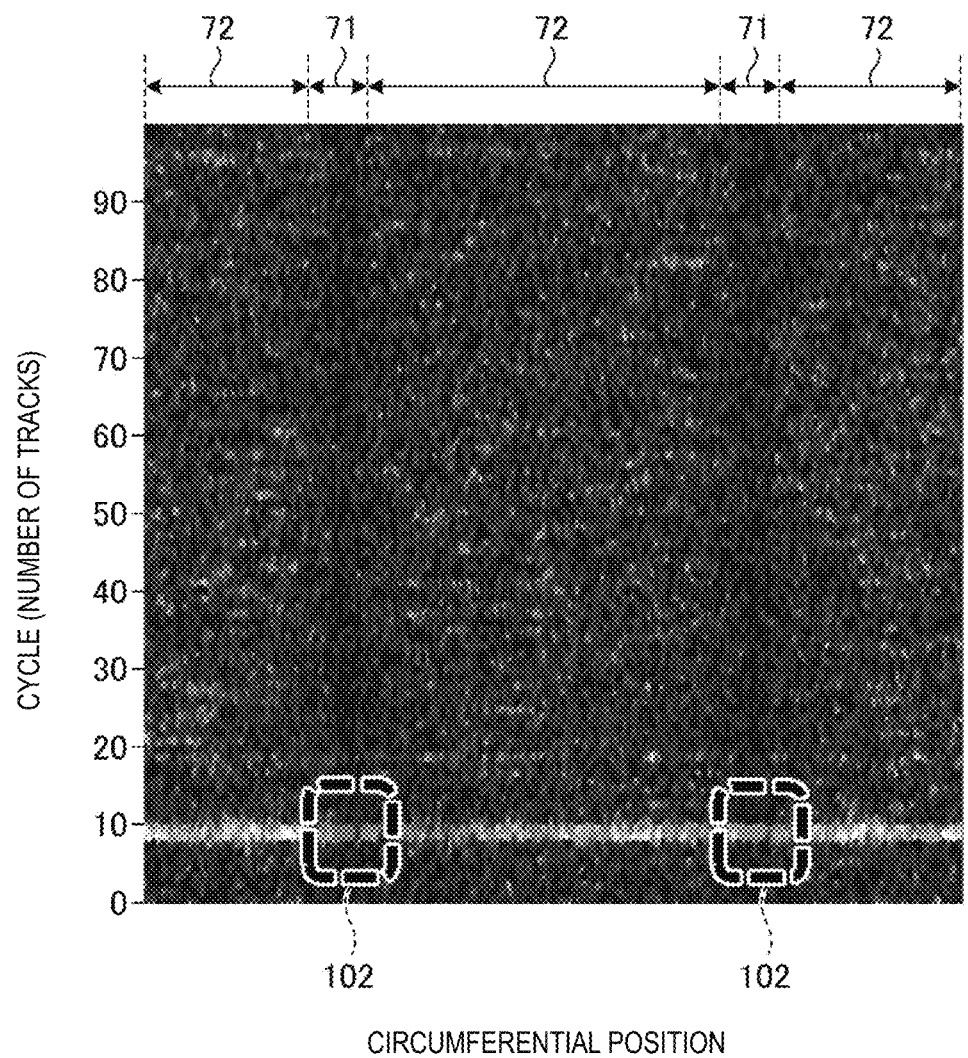
FIG. 11 is a diagram illustrating an example of the amplitude corrected by the processing according to the first embodiment.

FIG. 11 is a diagram illustrating an example of the amplitude corrected by the processing of S105 according to the first embodiment. Information represented by the vertical axis and information represented by the horizontal axis are as illustrated in FIG. 10. It can be read from FIG. 11 that the amplitude of the frequency component of the second frequency (i.e., the frequency with 10 tracks as one cycle) in the parallel portion, i.e., the amplitude drawn in the region denoted by reference numeral 102 is corrected to increase compared to the example illustrated in FIG. 10.

The description will be referred back to FIG. 8.

Following the processing of S105, the controller 30 acquires a plurality of RRO correction data by executing an inverse transform of the discrete Fourier transform on one or more frequency component groups for each servo sector 44 in the circumferential direction of the magnetic disk 11 (S106). By the processing of S106, the controller 30 may acquire the plurality of first RRO correction data including the second RRO correction data in which the frequency component of the second frequency resulting from the deviation of the servo track pitch is supplemented based on the third RRO correction data. The plurality of first RRO correction data acquired by the processing of S106 is referred to as a plurality of fourth RRO correction data. The plurality of fourth RRO correction data is an example of a plurality of fourth correction values.

Figure 12:
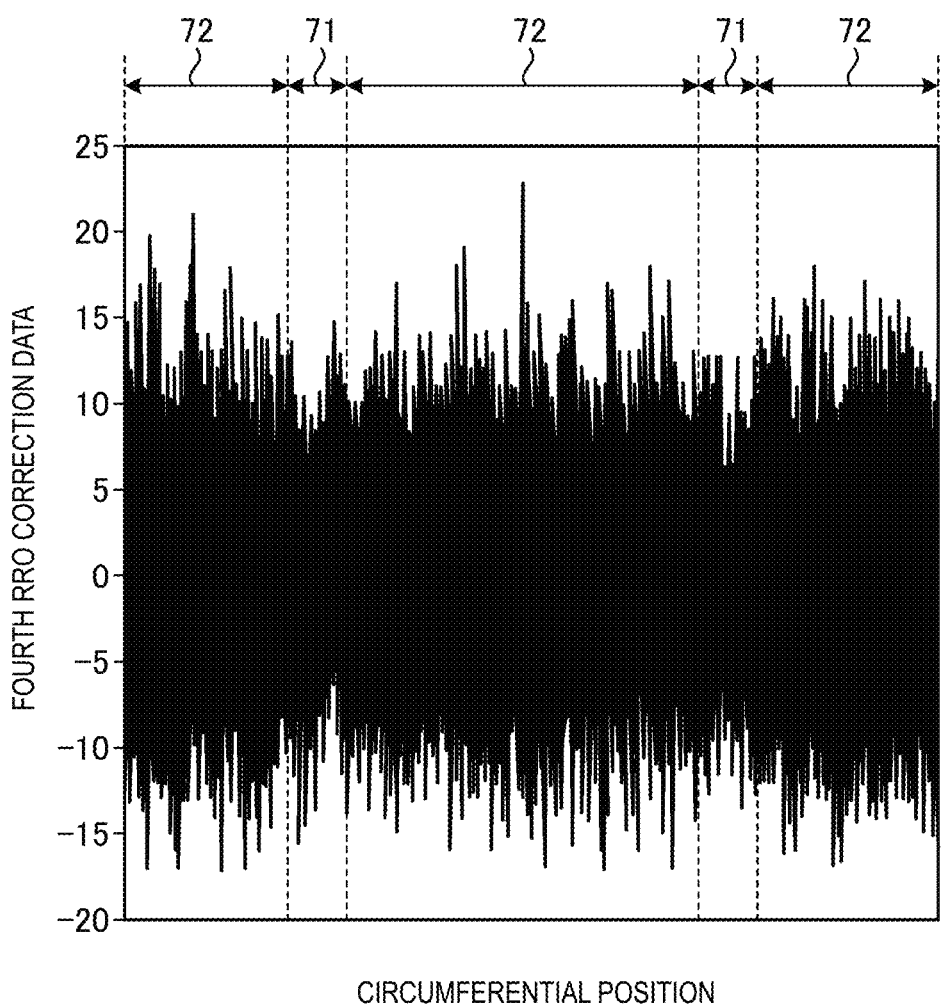
FIG. 12 is a diagram illustrating an example of a plurality of fourth RRO correction data according to the first embodiment.
Figure 13:
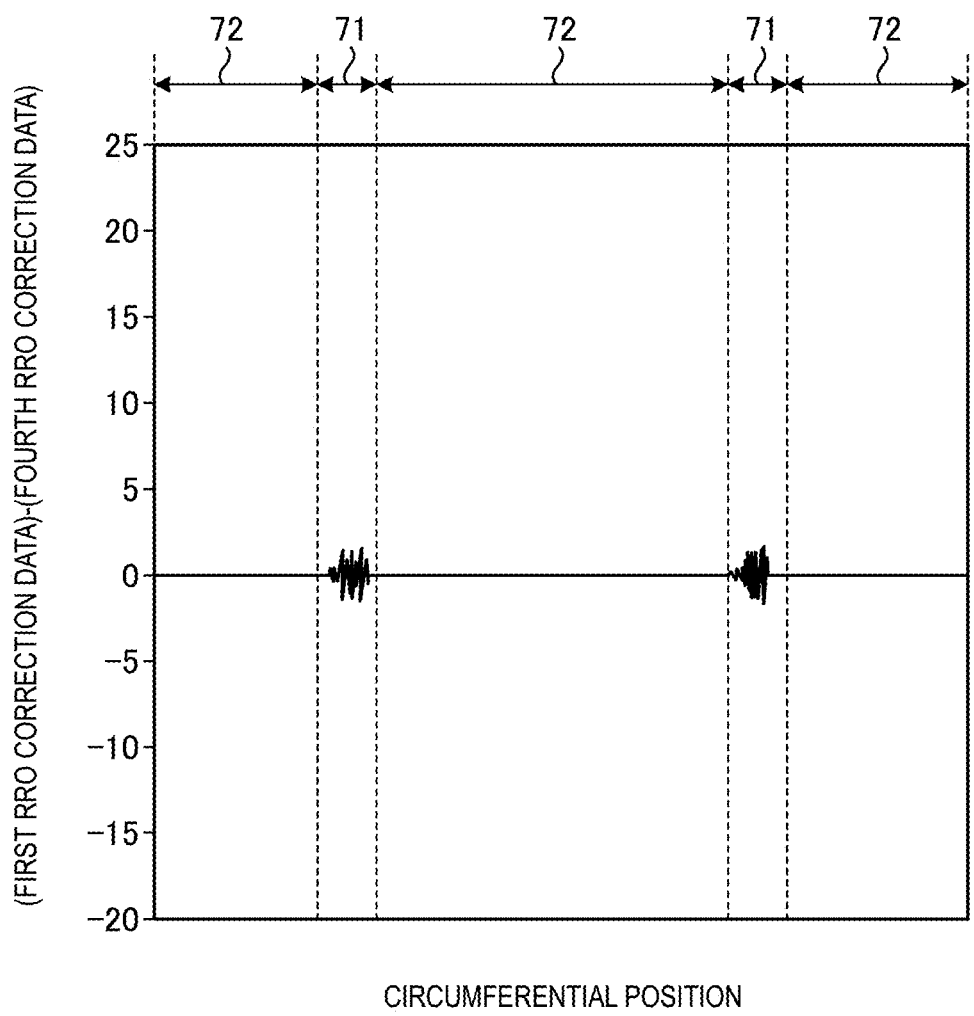
FIG. 13 is a schematic diagram illustrating an example of data supplemented with respect to the plurality of first RRO correction data associated with the first embodiment.

FIG. 12 is a diagram illustrating an example of the plurality of fourth RRO correction data according to the first embodiment. Further, FIG. 13 is a schematic diagram illustrating a difference between the plurality of first RRO correction data and the plurality of fourth RRO correction data associated with the first embodiment. The difference is data obtained by subtracting the plurality of fourth RRO correction data from the first RRO correction data. It can be read from FIGS. 12 and 13 that the RRO correction data of the servo sector 44 located in the parallel portion among the plurality of fourth RRO correction data is generated by supplementing the first RRO correction data. This supplemented data corresponds to the frequency component of the first frequency resulting from the deviation of the servo track pitch.

The description will be referred back to FIG. 8.

Following the processing of S106, the controller 30 writes the plurality of fourth RRO correction data to the magnetic disk 11 (S107). Then, a series of operations of the controller 30 associated with the first embodiment ends.

In this way, according to the first embodiment, the controller 30 acquires the reproduction signal of the servo burst data via the magnetic head 22 while moving the magnetic head 22 along the plurality of data tracks 61. Each of the plurality of data tracks 61 intersects one or more servo tracks 41 among the plurality of servo tracks 41 at a plurality of points. The controller 30 acquires the first RRO correction data on a per servo sector 44 basis based on the reproduction signal of the servo burst data. Then, the controller 30 corrects the second RRO correction data which is the first RRO correction data of the servo sector 44 located in the parallel portion 71 based on the third RRO correction data which is the first RRO correction data of the servo sector 44 located in the non-parallel portion 72. Then, the controller 30 writes the plurality of fourth RRO correction data which are the plurality of first RRO correction data including the corrected second RRO correction data to the magnetic disk 11.

Accordingly, deterioration in the accuracy of the RRO correction data of the servo sector 44 located in the parallel portion 71 due to the deviation of the servo track pitch may be prevented. As a result, it is possible to improve the correction accuracy of RRO.

Further, according to the first embodiment, the controller 30 executes a radial frequency analysis processing for the position of each servo sector 44 in the circumferential direction of the magnetic disk 11 with respect to the plurality of first RRO correction data. Then, the controller 30 selects the second frequency from among the plurality of first frequencies based on the result of the frequency analysis processing. Then, the controller 30 increases the amplitude of the frequency component of the second frequency included in the second RRO correction data according to the amplitude of the frequency component of the second frequency included in the third RRO correction data.

Thus, the controller 30 may perform the supplementation of the frequency component of the second frequency resulting from the deviation of the servo track pitch on the first RRO correction data (i.e., the second RRO correction data) of the servo track located in the parallel portion 71.

In the example described above, the controller 30 selected one of the plurality of first frequencies as the second frequency. The controller 30 may select each of two or more first frequencies as the second frequency. For example, the controller 30 may select all frequencies having the frequency component of the amplitude exceeding the criterion as the second frequency. Alternatively, the controller 30 may select all of the plurality of first frequencies as the second frequency. When two or more first frequencies are selected as the second frequency, the controller 30 executes the processing of S105 for each second frequency and then executes the processing of S106.

According to the first embodiment, the controller 30 acquires the plurality of fourth RRO correction data by executing an inverse transform of the frequency analysis processing after correcting the second RRO correction data.

In the example described above, the controller 30 executes a discrete Fourier transform as an example of the frequency analysis processing. Thus, the controller 30 performs an inverse transform of the discrete Fourier transform, thereby acquiring the plurality of fourth RRO correction data. As described above, the frequency analysis processing is not limited to the discrete Fourier transform.

Second Embodiment

In the second embodiment, the plurality of data tracks 61 are set so that the range of the parallel portion 71 is as narrow as possible. Specifically, the plurality of data tracks 61 are set so that, for the plurality of servo tracks 41, each of the plurality of data tracks 61 is displaced in the radial direction along the shape including a component of a first sinusoidal wave having the order of a first number and a component of a second sinusoidal wave having the order of a second number greater than the first number.

Figure 14:
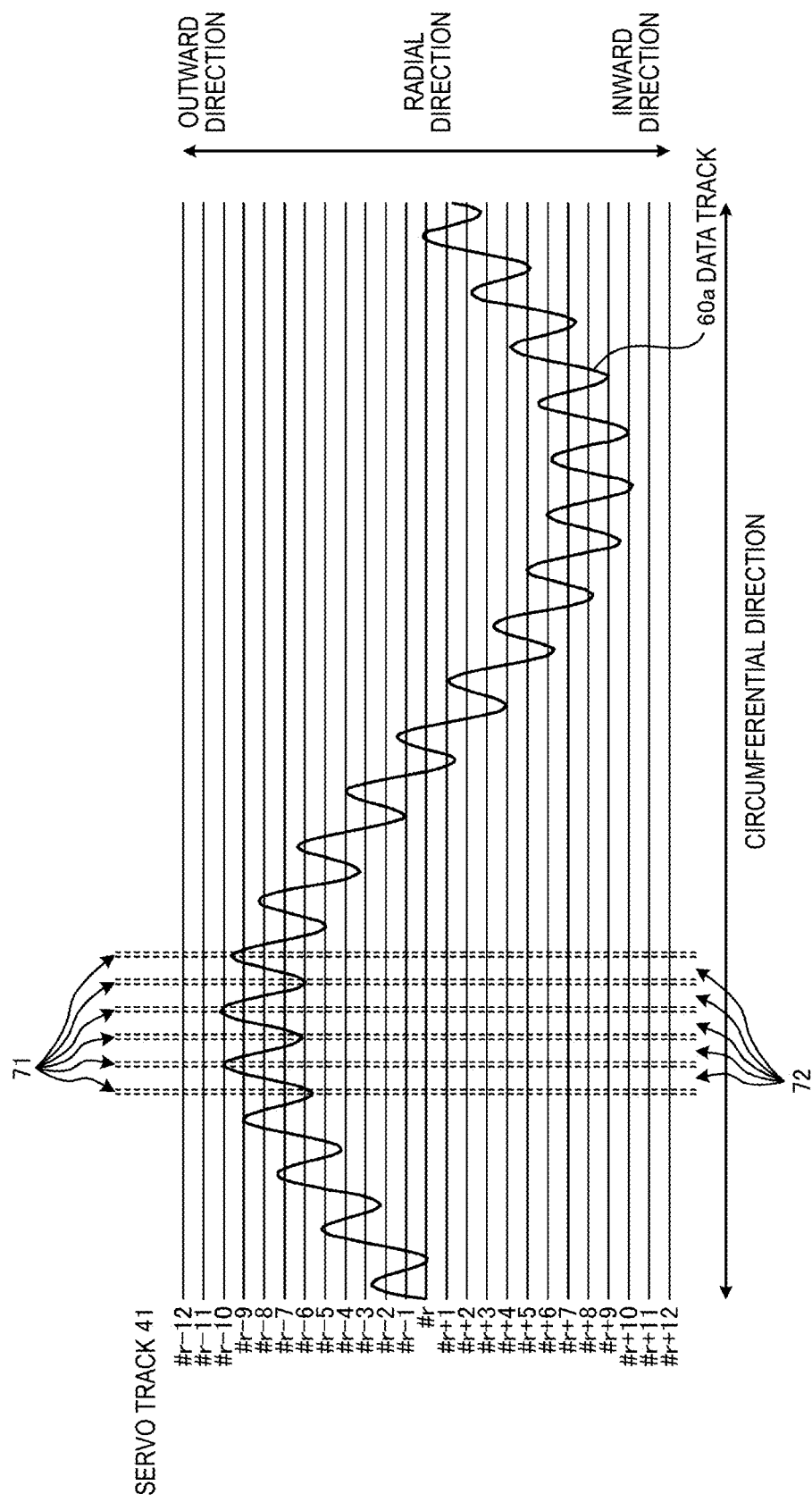
FIG. 14 is a graph illustrating an example of a positional relationship between each of a plurality of data tracks and a plurality of servo tracks associated with a second embodiment.

FIG. 14 is a graph illustrating an example of a positional relationship between each of the plurality of data tracks 61 and a plurality of servo tracks associated with the second embodiment. In this figure, a data track 60*a* which is one of the plurality of data tracks 61 associated with the second embodiment is drawn in the same format as in FIG. 4.

According to the example illustrated in FIG. 14, the data track 60*a* is displaced along the shape obtained by adding a twentieth-order sinusoidal wave to the primary sinusoidal wave on the basis of the plurality of servo tracks 41. Then, the data track 60*a* intersects 19 servo tracks 41 from the servo track #r−10 to the servo track #r+10 among 23 servo tracks 41 to which numbers from r−12 to r+12 are given at a plurality of points. The primary sinusoidal wave is an example of a first sinusoidal wave, and the twentieth-order sinusoidal wave is an example of a second sinusoidal wave. That is, in this example, the first number is "1" and the second number is "20".

Since the shape of the data track 60*a* has a component of the twentieth-order sinusoidal wave, the position of the data track 60*a* in the radial direction is displaced by 20 reciprocations per one circumference of the magnetic disk 11. Thus, in a portion where the phase of the twentieth-order sinusoidal wave becomes (½)Pi[rad] or (3/2)Pi[rad] in each of the 20 reciprocations, the data track 60*a* is parallel to the servo track 41. That is, each portion in which the phase of the twentieth-order sinusoidal wave becomes (½)Pi[rad] or (3/2)Pi[rad] corresponds to the parallel portion 71. In order to avoid the complexity of the drawing, in FIG. 14, the parallel portion 71 and the non-parallel portion 72 are illustrated only in a part of the circumferential position, and the illustration of the parallel portion 71 and the non-parallel portion 72 is omitted in the other part.

As the data track 60*a* contains the component of a high-order sinusoidal wave (in this example, the twentieth-order sinusoidal wave), the range of one parallel portion 71 is narrowed, and the total range of the parallel portions 71 for one circumference of the magnetic disk 11 is also narrowed. Since the total range of the parallel portions 71 with the low accuracy of the RRO correction data may be narrowed, the correction accuracy of the RRO may be improved.

The example in which the first number is "1" and the second number is "20" has been described above. The first number and the second number are not limited thereto as long as the second number is greater than the first number.

Further, the controller 30 may or may not perform the operation described in the first embodiment on the magnetic disk 11 of the second embodiment.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A magnetic disk device comprising:
   a magnetic disk having a surface on which servo burst data are written, the servo burst data defining a plurality of servo tracks in a form of concentric circles and a plurality of servo sectors arranged on the plurality of servo tracks along a circumferential direction of the magnetic disk;
   a magnetic head; and
   a controller configured to:
   acquire a reproduction signal of the servo burst data via the magnetic head while moving the magnetic head along a plurality of data tracks, which are in a form of concentric circles, each of the plurality of data tracks intersecting one or more of the servo tracks at a plurality of points;
   acquire, based on the reproduction signal, correction values for correcting a rotational synchronization component of an amount of positional deviation in a radial direction of the servo tracks, wherein the correction values include a first correction value, which is the correction value for the servo sector located at a first position, and a second correction value, which is the correction value for the servo sector located at a second position, the first position being a position where the data track and the servo track are substantially parallel in the circumferential direction of the magnetic disk, and the second position being a position where the data track and the servo track are not substantially parallel in the circumferential direction of the magnetic disk;
   adjust the first correction value based on the second correction value; and
   write the correction values including the adjusted first correction value onto the magnetic disk.

2. The magnetic disk device according to claim 1, wherein the controller is configured to adjust the first correction value based on the second correction value by:
   executing, for the plurality of correction values, a frequency analysis processing for a position of each servo sector in the circumferential direction of the magnetic disk;
   selecting a second frequency from among a plurality of first frequencies based on a result of the frequency analysis processing; and
   adjusting an amplitude of a frequency component of the second frequency included in the first correction value according to an amplitude of a frequency component of the second frequency included in the second correction value.

3. The magnetic disk device according to claim 2, wherein the controller is configured to acquire the correction values including the adjusted first correction value by executing an inverse transform of the frequency analysis processing after adjusting the amplitude of the frequency component of the second frequency included in the first correction value.

4. The magnetic disk device according to claim 3, wherein the frequency analysis processing is a discrete Fourier transform.

5. The magnetic disk device according to claim 1, wherein the concentric circles formed by the servo tracks are eccentric with respect to a center of the magnetic disk.

6. The magnetic disk device according to claim 5, wherein the concentric circles formed by the data tracks have a center that is common with the center of the magnetic disk.

7. The magnetic disk device according to claim 1, wherein the correction values including the adjusted first correction value are written into respective servo regions of the servo sectors.

8. A method of manufacturing a magnetic disk device comprising a magnetic head and a magnetic disk having a surface on which servo burst data are written, the servo burst data defining a plurality of servo tracks in a form of concentric circles and a plurality of servo sectors arranged on the plurality of servo tracks along a circumferential direction of the magnetic disk, the method comprising:

acquiring a reproduction signal of servo burst data via the magnetic head while moving the magnetic head along a plurality of data tracks, which are in a form of concentric circles, each of the plurality of data tracks intersecting one or more of the servo tracks at a plurality of points;

acquiring, based on the reproduction signal, correction values for correcting a rotational synchronization component of an amount of positional deviation in a radial direction of the servo tracks, wherein the correction values include a first correction value, which is the correction value for the servo sector located at a first position, and a second correction value, which is the correction value for the servo sector located at a second position, the first position being a position where the data track and the servo track are substantially parallel in the circumferential direction of the magnetic disk, and the second position being a position where the data track and the servo track are not substantially parallel in the circumferential direction of the magnetic disk;

adjusting the first correction value based on the second correction value; and writing the correction values including the adjusted first correction value onto the magnetic disk.

9. The method according to claim 8, wherein the controller is configured to adjust the first correction value based on the second correction value by:

executing, for the plurality of correction values, a frequency analysis processing for a position of each servo sector in the circumferential direction of the magnetic disk;

selecting a second frequency from among a plurality of first frequencies based on a result of the frequency analysis processing; and adjusting an amplitude of a frequency component of the second frequency included in the first correction value according to an amplitude of a frequency component of the second frequency included in the second correction value.

10. The method according to claim 9, wherein the correction values including the adjusted first correction value are acquired by executing an inverse transform of the frequency analysis processing after adjusting the amplitude of the frequency component of the second frequency included in the first correction value.

11. The method according to claim 10, wherein the frequency analysis processing is a discrete Fourier transform.

12. The method according to claim 8, wherein the concentric circles formed by the servo tracks are eccentric with respect to a center of the magnetic disk.

13. The method according to claim 12, wherein the concentric circles formed by the data tracks have a center that is common with the center of the magnetic disk.

14. The method according to claim 8, wherein the correction values including the adjusted first correction value are written into respective servo regions of the servo sectors.

* * * * *

UNITED STATES PATENT AND TRADEMARK OFFICE
CERTIFICATE OF CORRECTION

PATENT NO. : 11,521,647 B2
APPLICATION NO. : 17/461859
DATED : December 6, 2022
INVENTOR(S) : Takuya Ogawa et al.

Page 1 of 1

It is certified that error appears in the above-identified patent and that said Letters Patent is hereby corrected as shown below:

On the Title Page

(57) Abstract, Line 10, replace "fora" with --for a--.

Signed and Sealed this
Twenty-fourth Day of September, 2024

Katherine Kelly Vidal
*Director of the United States Patent and Trademark Office*